June 24, 1930. G. SCHWARZ 1,766,260

TEMPERATURE CONTROL

Filed May 9, 1927 thermostatic trap discharge

INVENTOR.
Gustav Schwarz
BY
Erwin, Wheeler & Woolard.
ATTORNEYS

Patented June 24, 1930

1,766,260

UNITED STATES PATENT OFFICE

GUSTAV SCHWARZ, OF WAUWATOSA, WISCONSIN

TEMPERATURE CONTROL

Application filed May 9, 1927. Serial No. 189,836.

This invention relates to improvements in thermostatic regulation of boilers. The invention has particular reference to a device for controlling the draft or drafts of the boiler in a steam or vapor heating system.

It is the object of the invention to provide a form of temperature regulation for devices of the above character which will respond readily to changes in temperature occurring within the boiler but which will tend to maintain boiler operation uniform, even in a relatively small installation, thereby avoiding the great fluctuation in temperature to which steam and vapor heating systems are customarily subject.

In the drawings.

Like parts are identified by the same reference characters throughout the several views.

Figure 1:
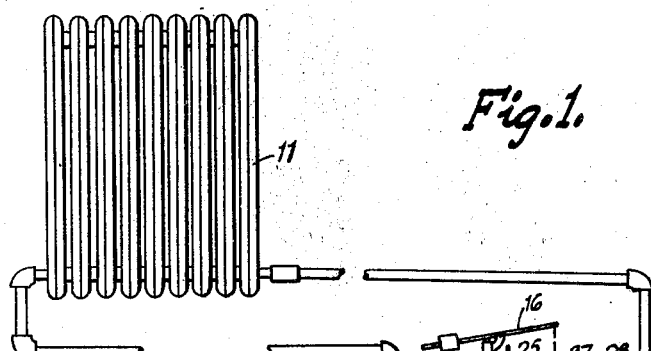
Figure 1 is a diagrammatic view of a boiler equipped with a device embodying this invention.

The boiler 5 is provided with drafts as represented by the draft door 6. This will be understood to be typical of any means of controlling the rate of combustion in the boiler. The boiler head 7 is filled with water to a depth shown at 8 in the sight glass 9. The steam or vapor output of the boiler is conveyed by a steam pipe to the point at which the heat is to be used, such point being represented here by the radiator 11 from which the return 12 leads to the lower portion of the boiler.

The thermostat 15 employed to control draft door 6 is of ordinary construction and includes the counterweighted lever 16 connected by a chain 17 with the draft 6 or other combustion control. The location of the thermostat, however, is unique.

The type of thermostat 15 herewith disclosed is one frequently used in hot water boilers where its portion 18 is introduced directly into the boiler water through an opening in the boiler. Attempts to use such a thermostat exposed to steam, however, have resulted in violent temperature changes. Before the steam is produced in sufficient quantities to act upon the thermostat, it will have filled the entire system which will radiate an undesirable large quantity of heat. As soon as the steam does reach the thermostat, the drafts will be closed at once and the fire will be checked to such an extent that the system will radiate too little heat.

In accordance with the present invention, the thermostat is located above the boiler in any convenient location, but is made to be subject to heat produced in the boiler and carried to the thermostat by the conductivity and convection of a column of fluid leading thereto.

A special fitting 20 is connected by a pipe 21 to the boiler. It will be noted that the pipe 21 is shown in dotted lines in Figure 1 to extend to a point below the water level in the boiler. Flow through pipe 21 is controlled by a valve designated in its entirety by reference character 22. Pipe section 23 which is a continuation of 21 above the valve projects for some distance into fitting 20 to direct water flowing through the pipe against the bottom of the portion 18 of the thermostat 15, which is screwed into the fitting from above. A drain port 24 opening into pipe 23 is adapted to allow water to leave fitting 20 when the pipe 23 is empty.

A thermometer 25 may be introduced into the top of the fitting to project its heat sensitive portion 26 approximately to the depth of thermostat portion 18 therein in order to give a visual indication of temperature, if desired.

Figure 2:
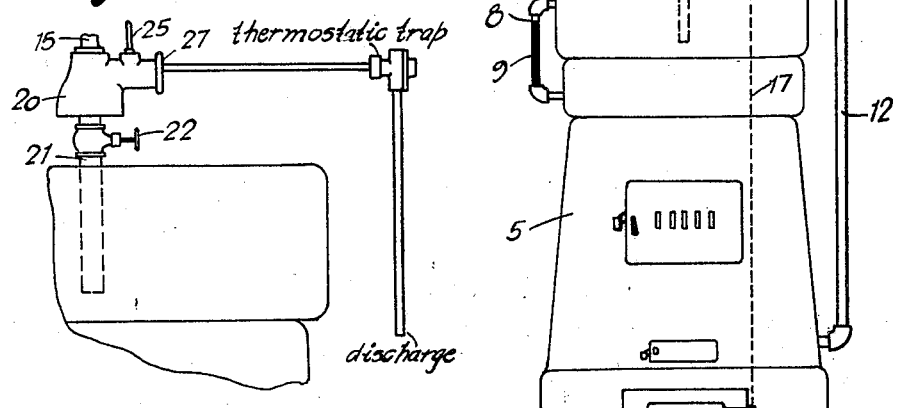
Figure 2 shows a modified form of connection.

Fitting 20 is provided with an outlet at 27. In the Figure 1 construction this outlet is connected by a pipe 28 to the radiator return 12. In Figure 2, pipe 28 is shown to be connected to an ordinary thermostatic trap, the outlet of which is connected by pipe to a sewer or other suitable point of discharge. Both arrangements have been found to operate satisfactorily although the Figure 1 arrangement was not tested in the precise system illustrated but in a more complex heating system forming the subject matter of a companion application. The hook-up illustrated is a simplification of that system for the purposes of this disclosure.

Figure 3:
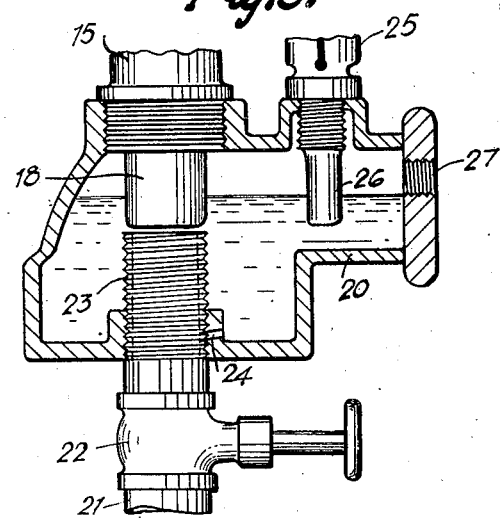
Figure 3 is a detail view in vertical section of the coupling member wherein the thermostat is exposed to temperatures which are a function of boiler operation.

It will be observed that the heating system shown in these drawings is a closed one; hence the expansion of the water as the boiler heats will cause the water to rise in tubes 21 and 23 into the thermostat chamber 20. In the Figure 2 construction, the thermostatic trap controlling the outlet of the chamber permits the escape of water therefrom as it cools so that the cooled water is replaced by warm water from time to time. In the Figure 1 construction despite the fact that the device is located above the water level in the boiler and despite the fact that its outlet is exposed to boiler pressures rather than to atmospheric pressures it has been found that there is circulation of water through the chamber 20 and upon examining the chamber when the boiler is heated, it will be found to be filled with water to the level indicated in Figure 3.

The circulation of water through either set of connections illustrated may be limited to any required extent by means of the valve 22. In any event, the temperature to which the thermostatic member 18 is exposed does not depend wholly upon circulation since the column of fluid which exists in pipes 21 and 23 during normal boiler operation conducts heat to the thermostat 15 in a measure proportionate to the heat changes being developed by the water. It will be obvious, however, that after the column of water reaches the thermostat to convey boiler heat thereto the thermostatic response will necessarily be comparatively sluggish and will not change or fluctuate excessively as is the case where a thermostat is exposed to live steam. As a result of this arrangement, the combustion controls connected with the thermostat are actuated gradually and a uniform radiation is preserved throughout the heating system. The effect of the thermostat may be regulated by hand or automatically in the usual way so that the temperature maintained in a room heated by radiator 11 may be controlled to suit extraneous conditions.

I claim:

1. In a device of the character described, the combination with a boiler, of a pipe communicating therewith below the water level therein, a fitting to which said pipe is connected, an outlet for said fitting above the level of water in said boiler, and a thermostatic regulating device having a portion within said fitting.

2. A device of the character described, comprising a combination of a hollow fitting provided with inlet and outlet ports, the outlet port being disposed above the inlet port, a thermostatic appliance having a prtion projecting into said fitting intermediate said ports, and a valve controlling one of said ports.

3. A device of the character described, comprising a hollow fitting, a thermostat having a portion projecting into the fitting, an inlet pipe for said fitting terminating in close proximity to said thermostat portion and apertured adjacent the bottom of the fitting to drain liquid accumulating therein.

4. A device of the character described, comprising a hollow fitting, a thermostat having a portion projecting into the fitting, an inlet pipe for said fitting terminating in close proximity to said thermostat portion and apertured adjacent the bottom of the fitting to drain liquid accumulating therein, an outlet pipe from said fitting adapted to permit circulation of liquid therethrough and a valve associated with one of said pipes and adapted to control said circulation.

5. A device of the character described, comprising a hollow fitting, a thermostat having a portion projecting into the fitting, an inlet pipe for said fitting terminating in close proximity to said thermostat portion and apertured adjacent the bottom of the fitting to drain water accumulating therein, and an outlet pipe communicating with the fitting above the lower margin of said portion.

6. In a device of the character described, the combination with a hot water boiler of a pipe leading upwardly from a point below the normal level of the water in the boiler to the exterior of such boiler, a hollow fitting at the upper end of the pipe having an outlet above the end of said pipe, an outlet pipe extending from said outlet in said fitting, and a thermostatic regulator extending into said fitting.

GUSTAV SCHWARZ.